(12) United States Patent
Takeda et al.

(10) Patent No.: US 9,341,900 B2
(45) Date of Patent: May 17, 2016

(54) LIQUID CRYSTAL DISPLAY DEVICE

(75) Inventors: Arihiro Takeda, Saitama (JP);
Hirokazu Morimoto, Fukaya (JP); Jin Hirosawa, Saitama (JP)

(73) Assignee: JAPAN DISPLAY INC., Tokyo (JP)

( * ) Notice: Subject to any disclaimer, the term of this patent is extended or adjusted under 35 U.S.C. 154(b) by 469 days.

(21) Appl. No.: 13/542,049

(22) Filed: Jul. 5, 2012

(65) Prior Publication Data
US 2013/0050601 A1 Feb. 28, 2013

(30) Foreign Application Priority Data

Aug. 25, 2011 (JP) ................................. 2011-184082

(51) Int. Cl.
*G02F 1/1343* (2006.01)
(52) U.S. Cl.
CPC .................... *G02F 1/134363* (2013.01); *G02F 2001/134381* (2013.01); *G02F 2201/121* (2013.01); *G02F 2201/122* (2013.01)
(58) Field of Classification Search
None
See application file for complete search history.

(56) References Cited

U.S. PATENT DOCUMENTS

| | | | |
|---|---|---|---|
| 6,266,116 B1 | 7/2001 | Ohta et al. | |
| 7,495,724 B2 | 2/2009 | Yoshida et al. | |
| 7,499,134 B2 | 3/2009 | Yamada et al. | |
| 7,688,416 B2 | 3/2010 | Fukuoka et al. | |
| 7,924,393 B2 | 4/2011 | Fukuoka et al. | |
| 7,936,405 B2 * | 5/2011 | Kitagawa | 349/33 |
| 8,228,474 B2 | 7/2012 | Imakawa et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2007/0200990 A1 | 8/2007 | Hirosawa et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2008/0192160 A1 | 8/2008 | Yoshida et al. | |
| 2009/0147201 A1 | 6/2009 | Yoshida et al. | |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/405,799, filed Feb. 27, 2012, Hirosawa, et al.

(Continued)

*Primary Examiner* — Richard Kim
(74) *Attorney, Agent, or Firm* — Oblon, McClelland, Maier & Neustadt, L.L.P.

(57) ABSTRACT

According to one embodiment, a liquid crystal display device includes a first substrate including a plurality of first signal lines disposed with a first pitch along a second direction, a plurality of second signal lines disposed with a second pitch along a first direction, and a first electrode including an n-number of first main electrodes (n is an integer of 2 or more), a second substrate including a second electrode including a plurality of second main electrodes disposed with a third pitch along the first direction, wherein an n-number of times the third pitch is substantially equal to the second pitch, and any one of the second main electrodes is located above each of the second signal lines.

12 Claims, 7 Drawing Sheets

(56) References Cited

U.S. PATENT DOCUMENTS

| | | |
|---|---|---|
| 2011/0075083 A1 | 3/2011 | Takeda et al. |
| 2011/0170027 A1* | 7/2011 | Nakanishi et al. ............ 349/33 |
| 2012/0099070 A1 | 4/2012 | Hirosawa et al. |
| 2012/0182501 A1 | 7/2012 | Fukuoka et al. |
| 2012/0182509 A1 | 7/2012 | Takano et al. |
| 2012/0236239 A1 | 9/2012 | Morita et al. |

FOREIGN PATENT DOCUMENTS

| | | |
|---|---|---|
| JP | 7-306417 | 11/1995 |
| JP | 8-271919 | 10/1996 |
| JP | 9-160041 | 6/1997 |
| JP | 9-160042 | 6/1997 |
| JP | 9-160061 | 6/1997 |
| JP | 9-230380 | 9/1997 |
| JP | 10-26765 | 1/1998 |
| JP | 10-90708 | 4/1998 |
| JP | 2000-81641 | 3/2000 |
| JP | 2005-3802 | 1/2005 |
| JP | 3644653 | 2/2005 |
| JP | 2005-242307 | 9/2005 |
| JP | 2009-109657 | 5/2009 |
| JP | 2009-192822 | 8/2009 |

OTHER PUBLICATIONS

U.S. Appl. No. 13/425,779, filed Mar. 21, 2012, Takano, et al.
U.S. Appl. No. 13/429,628, filed Mar. 26, 2012, Fujiyama, et al.
U.S. Appl. No. 13/449,871, filed Apr. 18, 2012, Hasegawa, et al.
U.S. Appl. No. 13/469,458, filed May 11, 2012, Takeda, et al.
U.S. Appl. No. 13/470,578, filed May 14, 2012, Takeda, et al.
U.S. Appl. No. 13/471,942, filed May 15, 2012, Kozuka, et al.
U.S. Appl. No. 13/546,655, filed Jul. 11, 2012, Takano, et al.
U.S. Appl. No. 13/553,228, filed Jul. 19, 2012, Fukuoka , et al.
U.S. Appl. No. 13/564,058, filed Aug. 1, 2012, Fujiyama, et al.
U.S. Appl. No. 13/562,647, filed Jul. 31, 2012, Takeda, et al.
Office Action issued May 7, 2013, in Japanese Patent Application No. 2011-184082 (with English-language translation).

* cited by examiner

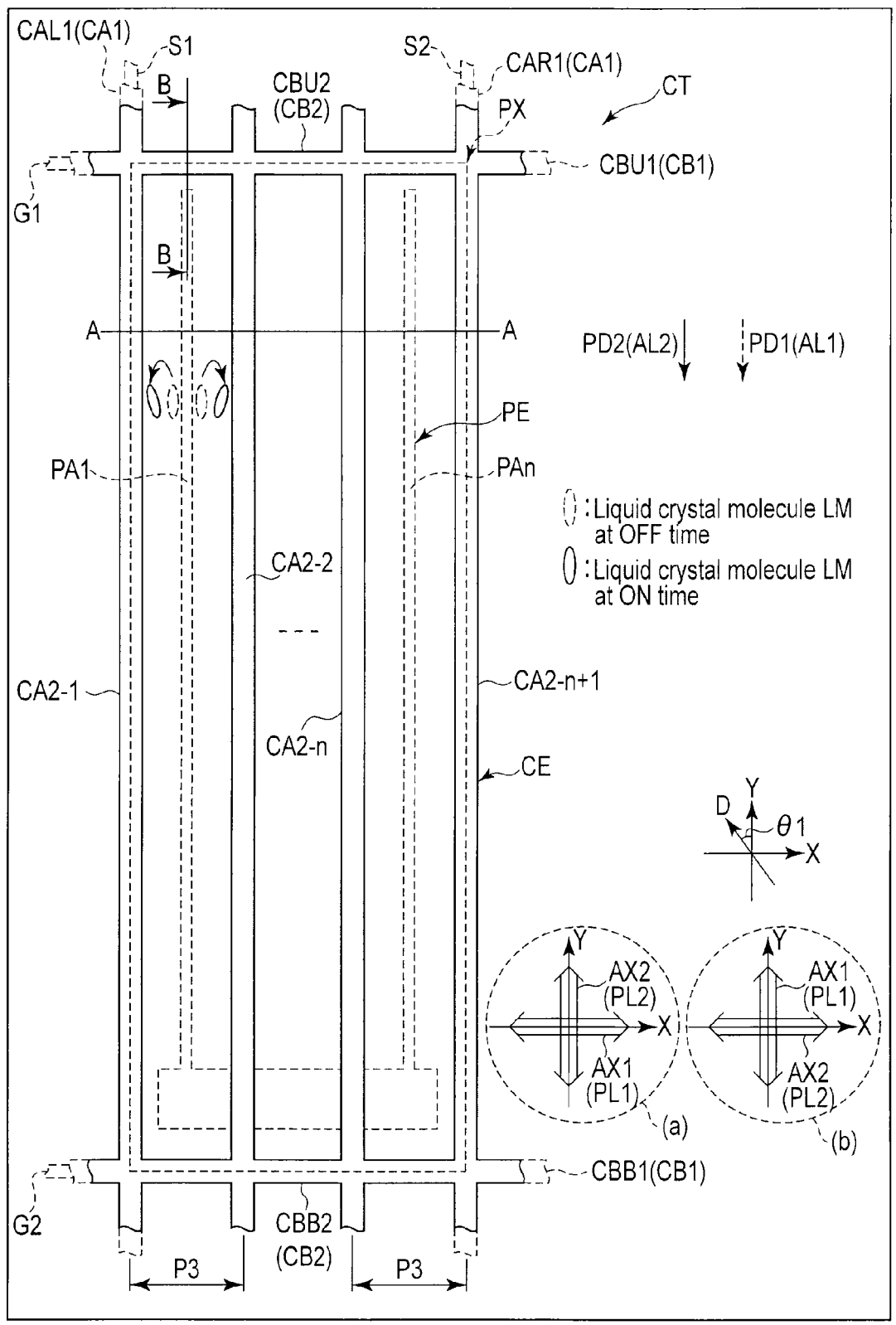
F I G. 3

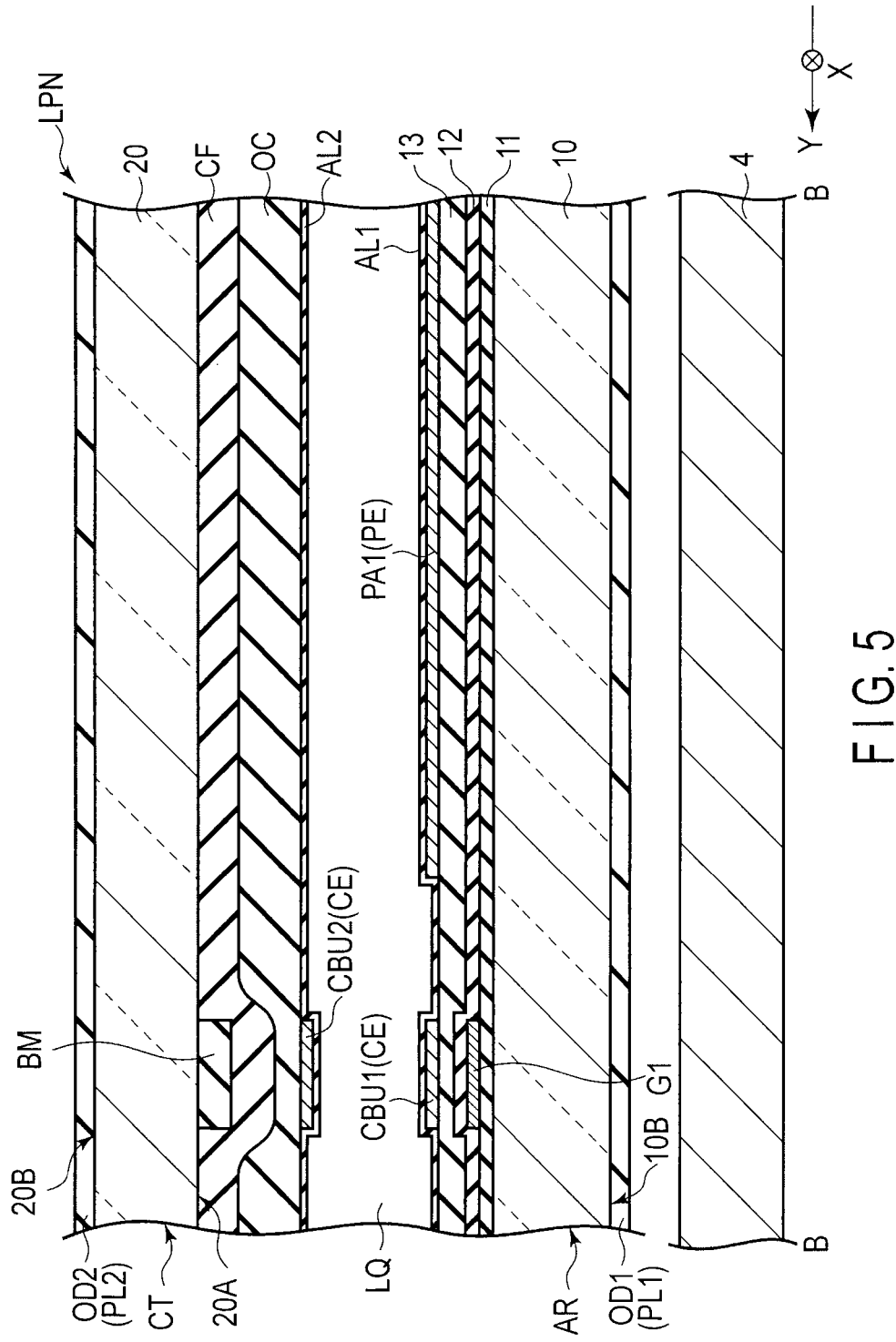
F I G. 5

LIQUID CRYSTAL DISPLAY DEVICE

CROSS-REFERENCE TO RELATED APPLICATIONS

This application is based upon and claims the benefit of priority from prior Japanese Patent Application No. 2011-184082, filed Aug. 25, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 3 is a plan view which schematically shows a structure example of a pixel in the counter-substrate shown in FIG. 1.

FIG. 5 is a schematic cross-sectional view, taken along line B-B in FIG. 3, showing a cross-sectional structure of the liquid crystal display panel shown in FIG. 3.

DETAILED DESCRIPTION

Figure 1:
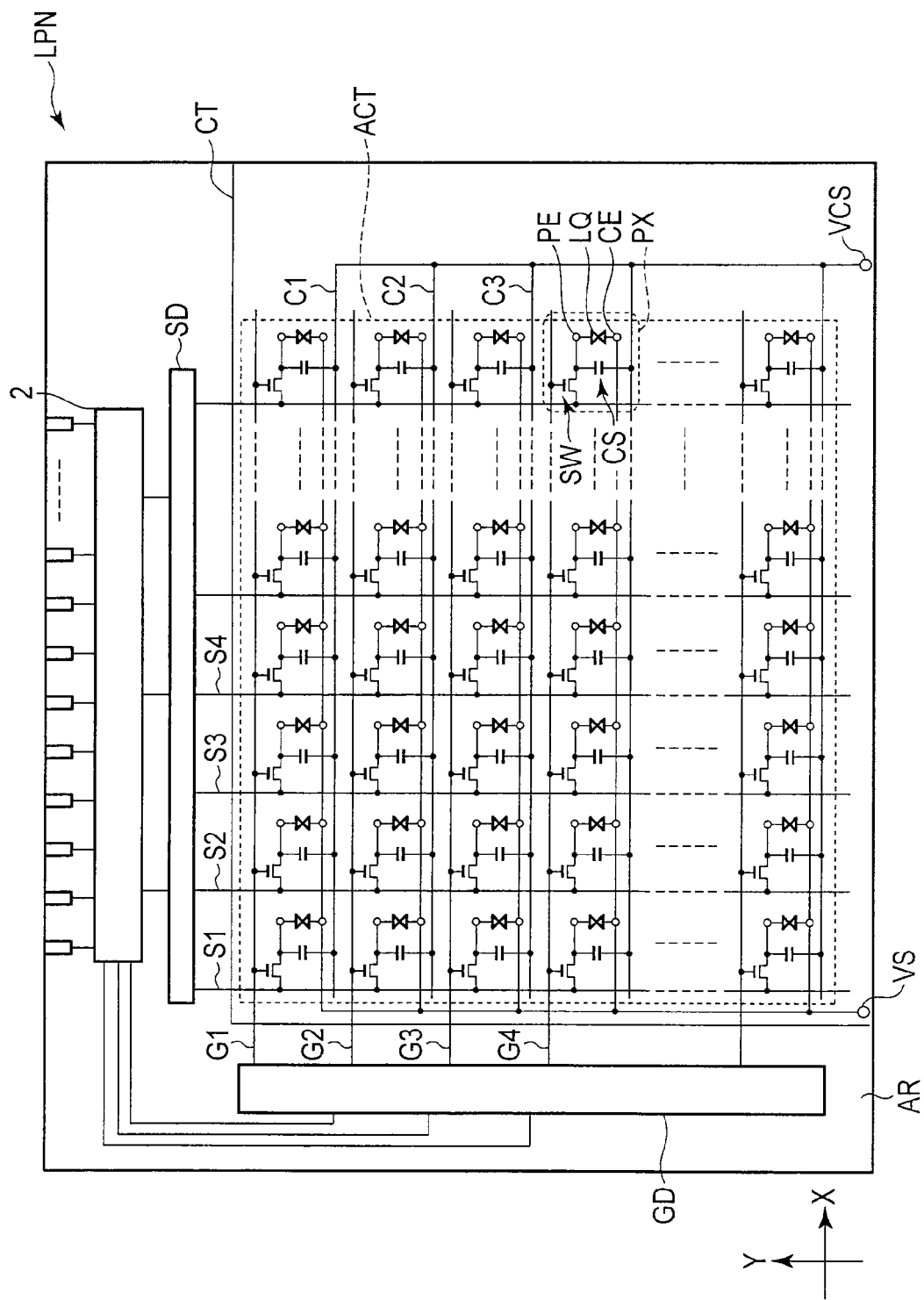
FIG. 1 is a view which schematically illustrates a structure and an equivalent circuit of a liquid crystal display device according to an embodiment.

In general, according to one embodiment, a liquid crystal display device includes: a first substrate including a plurality of first signal lines which extend in a first direction and are disposed with a first pitch along a second direction crossing the first direction, a plurality of second signal lines which extend in the second direction and are disposed with a second pitch along the first direction, and a first electrode including an n-number of first main electrodes (n is an integer of 2 or more) which are arranged in the first direction, each of the first main electrodes extending in the second direction between two neighboring ones of the second signal lines; a second substrate including a second electrode including a plurality of second main electrodes which extend in the second direction on both sides of each of the first main electrodes and are disposed with a third pitch along the first direction, and second sub-electrodes which are located above each of the first signal lines, extend in the first direction and are continuous with the second main electrodes; and a liquid crystal layer including liquid crystal molecules held between the first substrate and the second substrate, wherein an n-number of times the third pitch is substantially equal to the second pitch, and any one of the second main electrodes is located above each of the second signal lines.

According to another embodiment, a liquid crystal display device includes: a first substrate including a plurality of first signal lines which extend in a first direction and are disposed with a first pitch along a second direction crossing the first direction, a plurality of second signal lines which extend in the second direction and are disposed with a second pitch of 40 μm or more, which is less than the first pitch, along the first direction, and a first electrode including an n-number of first main electrodes (n is an integer of 2 or more) which are arranged in the first direction, each of the first main electrodes extending in the second direction between two neighboring ones of the second signal lines; a second substrate including a second electrode including a plurality of second main electrodes which extend in the second direction on both sides of each of the first main electrodes and are disposed with a third pitch along the first direction; and a liquid crystal layer including liquid crystal molecules held between the first substrate and the second substrate, wherein an n-number of times the third pitch is substantially equal to the second pitch, and any one of the second main electrodes is located above each of the second signal lines.

According to another embodiment, a liquid crystal display device includes: a first substrate including a first source line and a second source line which are disposed with a pitch of 40 μm or more along a first direction and extend in a second direction crossing the first direction, a first electrode of a pixel potential including a plurality of first main electrodes which are disposed between the first source line and the second source line and extend in the second direction, and third main electrodes of a common potential which are opposed to the first source line and the second source line; a second substrate including a second electrode of a common potential including second main electrodes which are located above each of the third main electrodes and between the first main electrodes, and extend in the second direction; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix.

The liquid crystal display panel LPN includes, in the active area ACT, a plurality of gate lines G (G1, G2, . . . ), a plurality of storage capacitance lines C (C1, C2, . . . ), and a plurality of source lines S (S1, S2, . . . ). The gate lines G and storage capacitance lines C correspond to signal lines extending substantially linearly, for example, in a first direction X. The gate lines G and storage capacitance lines C are alternately arranged in parallel along a second direction Y crossing the first direction X. In this example, the first direction X and the second direction Y are substantially perpendicular to each other. The source lines S cross the gate lines G and storage capacitance lines C. The lines S correspond to signal lines extending substantially linearly along the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface of the array substrate AR or a substrate major surface (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE is disposed common to the pixel electrodes PE of plural pixels PX via the liquid crystal layer LQ. The pixel electrodes PE and common electrode CE are formed of a light-transmissive, electrically conductive material such as indium tin oxide (ITO) or indium zinc oxide (IZO). However, the pixel electrodes PE and common electrode CE may be formed of other metallic material such as aluminum.

The array substrate AR includes a power supply module VS for applying a voltage to the common electrode CE. The power supply module VS is formed, for example, on the outside of the active area ACT. The common electrode CE of the counter-substrate CT is led out to the outside of the active area ACT, and is electrically connected to the power supply module VS via an electrically conductive member (not shown).

Figure 2:
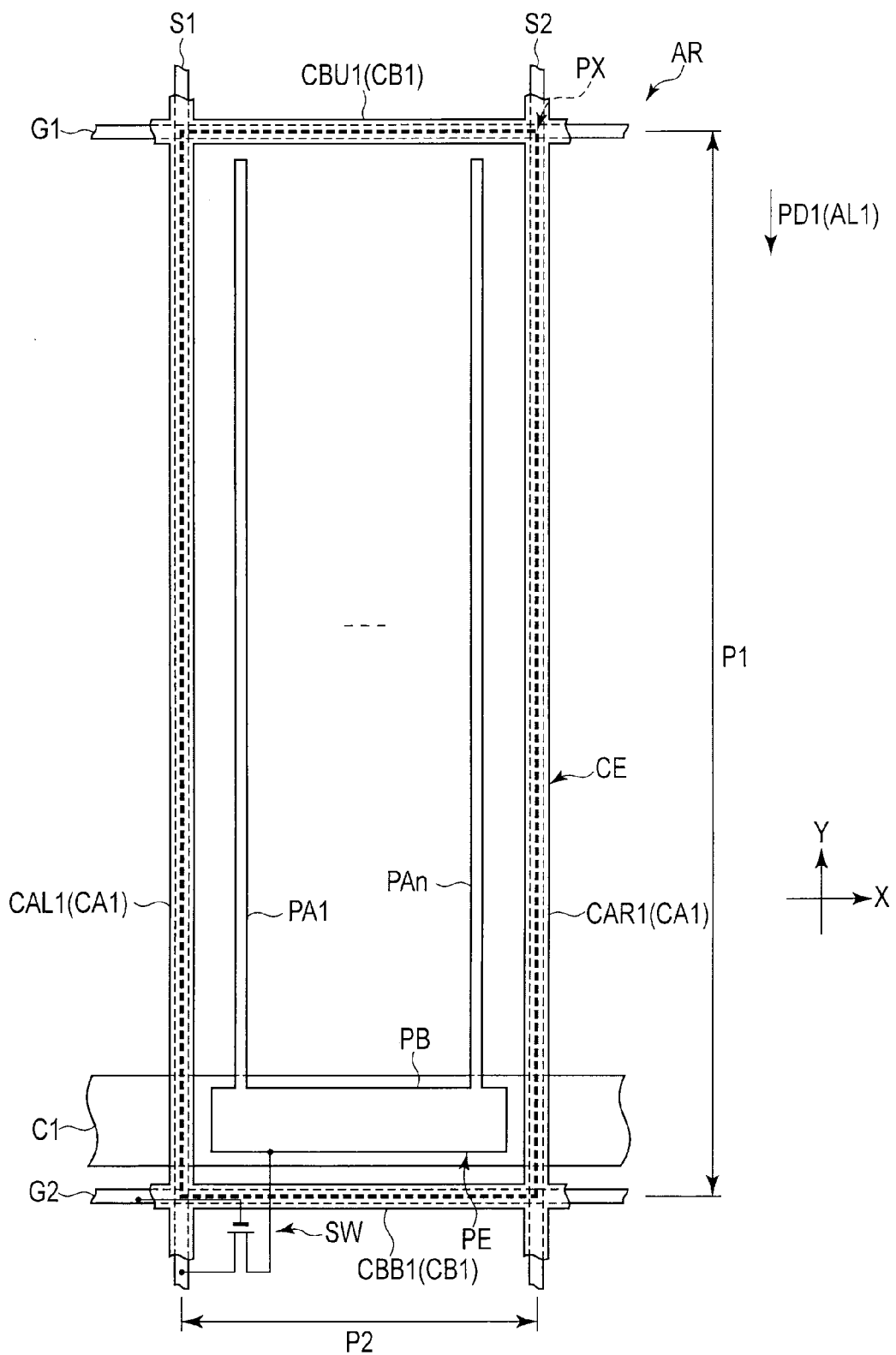
FIG. 2 is a plan view which schematically shows a structure example of a pixel at a time when an array substrate shown in FIG. 1 is viewed from a counter-substrate side.

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a first alignment film AL1 In the example illustrated, the array substrate AR further includes a part of a common electrode CE.

In the example illustrated, the pixel PX has a rectangular shape having a less length in the first direction X than in the second direction Y, as indicated by a broken line. The gate line G1 and gate line G2 are disposed with a first pitch P1 along the second direction, and extend in the first direction X. The storage capacitance line C1 is disposed between the gate line G1 and gate line G2 and extends in the first direction X. The source line S1 and source line S2 are disposed with a second pitch P2 along the first direction X, and extend in the second direction Y. In the meantime, other gate lines, not shown, are also disposed with the first pitch P1, and other source lines, not shown, are also disposed with the second pitch P2.

In the pixel PX illustrated, the source line S1 is disposed at a left side end portion, and the source line S2 is disposed at a right side end portion. Strictly speaking, the source line S1 is disposed to extend over a boundary between the pixel PX and a pixel neighboring on the left side, and the source line S2 is disposed to extend over a boundary between the pixel PX and a pixel neighboring on the right side.

Specifically, the length of the pixel PX in the first direction X corresponds to the second pitch P2 between the source lines.

In addition, in the pixel PX, the gate line G1 is disposed at an upper side end portion, and the gate line G2 is disposed at a lower side end portion. Strictly speaking, the gate line G1 is disposed to extend over a boundary between the pixel PX and a pixel neighboring on the upper side, and the gate line G2 is disposed to extend over a boundary between the pixel PX and a pixel neighboring on the lower side.

Specifically, the length of the pixel PX in the second direction Y corresponds to the first pitch P1 between the gate lines. The first pitch P1 is greater than the second pitch P2.

In the pixel PX illustrated, the storage capacitance line C1 is eccentrically disposed closer to the gate line G2 than to the gate line G1. Specifically, the distance between the storage capacitance line C1 and the gate line G2 is less than the distance between the storage capacitance line C1 and the gate line G1.

The switching element SW in the illustrated example is electrically connected to the gate line G2 and source line S1. The switching element SW is provided at an intersection between the gate line G2 and source line S1. The switching element SW is provided, for example, in an area overlapping the source line S1 and storage capacitance line C1, and does not substantially protrude from the area overlapping the source line S1 and storage capacitance line C1, thus suppressing a decrease in area of an aperture portion which contributes to display.

The pixel electrode PE is disposed between the source line S1 and source line S2 which neighbor each other. In addition, the pixel electrode PE extends immediately above the storage capacitance line C1 and is located between the gate line G1 and gate line G2. The pixel electrode PE is electrically connected to the switching element SW.

The pixel electrode PE includes, as main electrodes, an n-number of main pixel electrodes PA1 to PAn (n is an integer of 2 or more), and a sub-pixel electrode PB as an at least one sub-electrode. The main pixel electrodes PA1 to PAn and the sub-pixel electrode PB are electrically connected to each other.

Each of the main pixel electrodes PA1 to PAn linearly extends in the second direction Y from the sub-pixel electrode PB toward the gate line G1 (i.e. from the sub-pixel electrode PB to the vicinity of the upper side end portion of the pixel PX). Each of the main pixel electrodes PA1 to PAn is formed in a strip shape having a substantially equal width along the first direction X.

The sub-pixel electrode PB is located in an area overlapping the storage capacitance line C1, and is electrically connected to the switching element SW. In the example illustrated, the number of sub-pixel electrodes PB is one, but the number of sub-pixel electrodes PB may be two or more.

The pixel electrode PE is disposed between the source line S1 and source line S2 which neighbor each other. In other words, the source line S1 and source line S2 are disposed on both sides of the pixel electrode PE. Needless to say, the main pixel electrodes PA1 to PAn are disposed between the source line S1 and source line S2.

The common electrode CE includes first main common electrodes CA1 as main electrodes and first sub-common electrodes CB1 as sub-electrodes on the array substrate AR. The first main common electrodes CA1 and first sub-common electrodes CB1 are electrically connected to each other.

The first main common electrodes CA1 extend, in the X-Y plane, linearly in the second direction Y that is substantially parallel to the direction of extension of the main pixel electrodes PA, on both sides of the pixel electrode PE. Alternatively, the first main common electrodes CA1 are opposed to the source lines S and extend substantially in parallel to the direction of extension of the main pixel electrodes PA. The first main common electrode CA1 is formed in a strip shape having a substantially equal width in the first direction X.

In the example illustrated, two first main common electrodes CA1 are arranged in parallel with a distance in the first direction X, and are located at left and right end portions of the pixel PX, respectively. In the description below, in order to distinguish these first main common electrodes CA1, the first main common electrode located on the left side in the Figure is referred to as "CAL1", and the first main common electrode located on the right side is referred to as "CAR1". The first main common electrode CAL1 is opposed to the source line S1, and the first main common electrode CAR1 is opposed to the source line S2.

The first sub-common electrodes CB1 extend, in the X-Y plane, linearly in the first direction X that is substantially parallel to the direction of extension of the sub-pixel electrode PB, on both sides of the pixel electrode PE. Alternatively, the first sub-common electrodes CB1 are opposed to the gate lines G and extend substantially in parallel to the direction of extension of the sub-pixel electrode PB. The first sub-common electrode CB1 is formed in a strip shape. The width in the second direction Y of the first sub-common electrode CB1 may not necessarily be uniform. The first sub-common electrodes CB1 are formed integral or continuous with the first main common electrodes CA1, and are electrically connected to the first main common electrodes CA1.

In the example illustrated, two first sub-common electrodes CB1 are arranged in parallel with a distance in the second direction Y, and are disposed at upper and lower end portions of the pixel PX, respectively. In the description below, in order to distinguish these first sub-common electrodes CB1, the first sub-common electrode located on the upper side in the Figure is referred to as "CBU1", and the first sub-common electrode located on the lower side is referred to as "CBB1". The first sub-common electrode CBU1 is opposed to the gate line G1, and the first sub-common electrode CBB1 is opposed to the gate line G2.

In the pixel PX, the first main common electrode CAL1 is disposed at the left side end portion, the first main common electrode CAR1 is disposed at the right side end portion, the first sub-common electrode CBU1 is disposed at the upper side end portion, and the first sub-common electrode CBB1 is disposed at the lower side end portion. Strictly speaking, the first main common electrode CAL1 is disposed to extend over a boundary between the pixel PX and a pixel neighboring on the left side, the first main common electrode CAR1 is disposed to extend over a boundary between the pixel PX and a pixel neighboring on the right side, the first sub-common electrode CBU1 is disposed to extend over a boundary between the pixel PX and a pixel neighboring on the upper side, and the first sub-common electrode CBB1 is disposed to extend over a boundary between the pixel PX and a pixel neighboring on the lower side. Specifically, in the example illustrated, the common electrode provided on the array substrate AR, or the first main common electrodes CA1 and first sub-common electrodes CB1, are formed in a grid shape which partitions the pixel PX.

Paying attention to the positional relationship between the pixel electrode PE and the common electrode CE, the following relationship is established.

In the X-Y plane, the main pixel electrodes PA and the first main common electrodes CA1 are arranged substantially parallel to each other. In this case, in the X-Y plane, neither of the first main common electrodes CA1 overlaps the pixel electrode PE. Specifically, plural main pixel electrodes PA1 to PAn are located between the first main common electrode CAL1 and first main common electrode CAR1 which neighbor each other with a distance in the first direction X.

In addition, in the X-Y plane, the sub-pixel electrode PB and the first sub-common electrodes CB1 are arranged substantially parallel to each other. In this case, in the X-Y plane, neither of the first sub-common electrodes CB1 overlaps the pixel electrode PE. Specifically, one sub-pixel electrode PB is located between the first sub-common electrode CBU1 and first sub-common electrode CBB1 which neighbor each other with a distance in the second direction Y.

FIG. 3 is a plan view which schematically shows a structure example of one pixel PX in the counter-substrate CT shown in FIG. 1. FIG. 3 is a plan view in the X-Y plane. FIG. 3 shows only parts which are necessary for the description, and indicates, by broken lines, the pixel electrode PE, first main common electrodes CA1 and first sub-common electrodes CB1 which are provided on the array substrate.

The common electrode CE includes second main common electrodes CA2 as main electrodes and second sub-common electrodes CB2 as sub-electrodes on the counter-substrate CT. The second main common electrodes CA2 and second sub-common electrodes CB2 are electrically connected to each other. In addition, the second main common electrodes CA2 and second sub-common electrodes CB2 are electrically connected to the first main common electrodes CA1 and first sub-common electrodes CB1 provided on the array substrate, for example, on the outside of the active area. The second main common electrodes CA2 and second sub-common electrodes CB2 have the same potential as the first main common electrodes CA1 and first sub-common electrodes CB1.

The second main common electrodes CA2 extend, in the X-Y plane, linearly in the second direction Y that is substantially parallel to the direction of extension of the main pixel electrodes PA, on both sides of the main pixel electrodes PA1 to PAn. Alternatively, the second main common electrodes CA2 are disposed above the source lines S and are each disposed in between the main pixel electrodes PA, and extend substantially in parallel to the direction of extension of the main pixel electrodes PA. Alternatively, the second main common electrodes CA2 are disposed above the first main common electrodes CA1 and are each disposed in between the main pixel electrodes PA, and extend substantially in parallel to the direction of extension of the main pixel electrodes PA. The second main common electrode CA2 is formed in a strip shape having a substantially equal width in the first direction X.

In the example illustrated, in each pixel PX, an (n+1) number of second main common electrodes CA2-1 to CA2-$n$+1 are arranged with a third pitch P3 along the first direction X. The second main common electrode CA2-1 is opposed to the first main common electrode CAL1 (or disposed above the source line S1). The second main common electrode CA2-$n$+1 is opposed to the first main common electrode CAR1 (or disposed above the source line S2).

In the pixel PX, the second main common electrode CA2-1 is disposed at the left side end portion, and the second main common electrode CA2-$n$+1 is disposed at the right side end portion. Strictly speaking, the second main common electrode CA2-1 is disposed to extend over a boundary between the pixel PX and a pixel neighboring on the left side, and the second main common electrode CA2-$n$+1 is disposed to extend over a boundary between the pixel PX and a pixel neighboring on the right side.

An (n−1) number of second main common electrodes CA2-2 to CA2-$n$ are disposed between the second main common electrode CA2-1 and the second main common electrode CA2-$n$+1, and are arranged with an equal pitch (third pitch). The second main common electrodes CA2-2 neighbors the second main common electrodes CA2-1, and the second main common electrodes CA2-$n$ neighbors the second main common electrodes CA2-$n$+1.

The second main common electrodes CA2-1 and second main common electrodes CA2-2 are located on both sides of the main pixel electrode PA1. In the meantime, a main pixel electrode PA2 (not shown) neighbors the main pixel electrode PA1, and the main pixel electrode PA1 and main pixel electrode PA2 are located on both sides of the second main common electrode CA2-2.

Similarly, the second main common electrodes CA2-$n$ and second main common electrodes CA2-$n$+1 are located on both sides of the main pixel electrode PAn. In the meantime, a main pixel electrode PAn−1 (not shown) neighbors the main pixel electrode PAn, and the main pixel electrode PAn−1 and main pixel electrode PAn are located on both sides of the second main common electrode CA2-$n$.

Specifically, in the X-Y plane, the second main common electrodes CA2 and main pixel electrodes PA are alternately arranged along the first direction X. In addition, the second main common electrodes CA2, which are located at both the left and right end portions of the pixel PX, are opposed to the first main common electrodes CA1 (or disposed above the source lines).

The second sub-common electrodes CB2 extend, in the X-Y plane, linearly in the first direction X that is substantially parallel to the direction of extension of the sub-pixel electrode PB, on both sides of the pixel electrode PE. Alternatively, the second sub-common electrodes CB2 are opposed to the first sub-common electrodes CB1 and extend substantially in parallel to the direction of extension of the sub-pixel electrode PB. Alternatively, the second sub-common electrodes CB2 are disposed above the gate lines G and extend substantially in parallel to the direction of extension of the sub-pixel electrode PB. The second sub-common electrodes CB2 are formed integral or continuous with the second main common electrodes CA2, and are electrically connected to the second main common electrodes CA2. Specifically, in the counter-substrate CT, the common electrode CE is formed in a grid shape.

In the example illustrated, two second sub-common electrodes CB2 are arranged in parallel with a distance in the second direction Y, and are disposed at upper and lower end portions of the pixel PX, respectively. In the description below, in order to distinguish these second sub-common electrodes CB2, the second sub-common electrode located on the upper side in the Figure is referred to as "CBU2", and the second sub-common electrode located on the lower side is referred to as "CBB2". The second sub-common electrode CBU2 is opposed to the first sub-common electrode CBU1 (or disposed above the gate line G1). The second sub-common electrode CBB2 is opposed to the first sub-common electrode CBB1 (or disposed above the gate line G2).

In the pixel PX, the second sub-common electrode CBU2 is disposed at the upper side end portion, and the second sub-common electrode CBB2 is disposed at the lower side end portion. Strictly speaking, the second sub-common electrode CBU2 is disposed to extend over a boundary between the pixel PX and a pixel neighboring on the upper side, and the second sub-common electrode CBB2 is disposed to extend over a boundary between the pixel PX and a pixel neighboring on the lower side.

One main pixel electrode PA is necessarily located between second main common electrodes CA2 which are disposed with the third pitch P3. In addition, the second main common electrodes CA2 are located at both the left and right end portions of the pixel PX, and are located above the source lines S. Accordingly, when the number of main pixel electrodes PA of the pixel electrode PE is n, an n-number of times the third pitch P3 of second main common electrodes CA2 is substantially equal to the second pitch P2 of source lines S.

Figure 4:
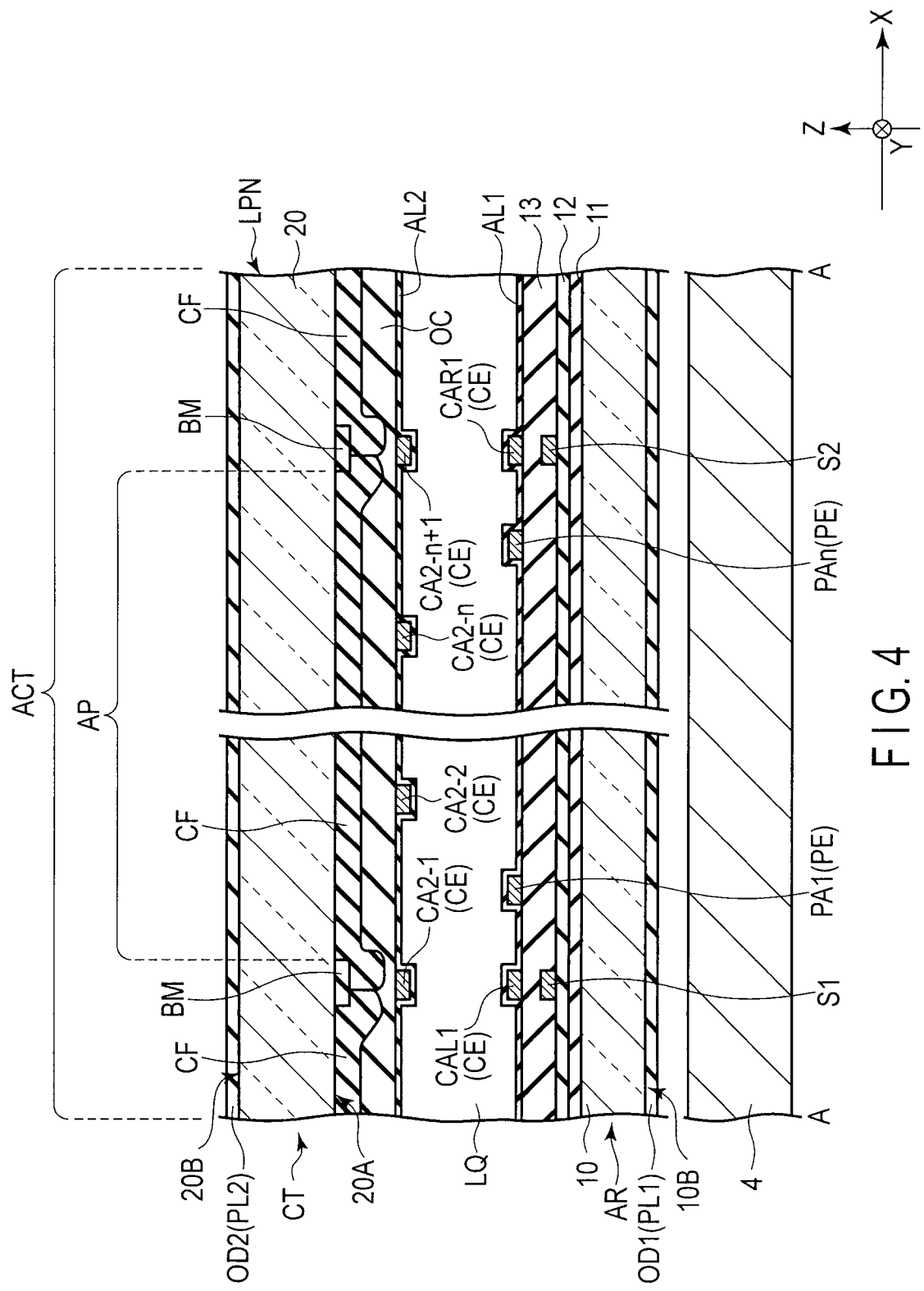
FIG. 4 is a schematic cross-sectional view, taken along line A-A in FIG. 3, showing a cross-sectional structure of a liquid crystal display panel shown in FIG. 3.

FIG. 4 is a schematic cross-sectional view, taken along line A-A in FIG. 3, showing a cross-sectional structure of the liquid crystal display panel LPN shown in FIG. 3. FIG. 5 is a schematic cross-sectional view, taken along line B-B in FIG. 3, showing a cross-sectional structure of the liquid crystal display panel LPN shown in FIG. 3. FIG. 4 and FIG. 5 show only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. The array substrate AR includes, on the inside of the first insulative substrate 10, that is, on the side facing the counter-substrate CT, a gate line G1, a gate line G2, a storage capacitance line C1, a source line S1, a source line S2, a pixel electrode PE, a common electrode CE, a first insulation film 11, a second insulation film 12, a third insulation film 13, and a first alignment film AL1.

The gate line G1, gate line G2 and storage capacitance line C1 are formed on the first insulation film 11, and are covered with the second insulation film 12. The source line S1 and source line S2 are formed on the second insulation film 12 and are covered with the third insulation film 13. Specifically, the second insulation film 12 corresponds to an interlayer insulation film between the gate line G1, gate line G2 and storage capacitance C1, on the one hand, and the source line S1 and source line S2, on the other hand.

The main pixel electrodes PA1 to PAn and sub-pixel electrode PB of the pixel electrode PE, and the first main common electrode CAL1, first main common electrode CAR1, first sub-common electrode CBU1 and first sub-common electrode CBB1 of the common electrode CE are formed on an upper surface of the same insulation film, that is, an upper surface of the third insulation film 13. The pixel electrode PE, and the first main common electrode CAL1, first main common electrode CAR1, first sub-common electrode CBU1 and first sub-common electrode CBB1 of the common electrode CE can be formed of the same material.

The main pixel electrodes PA1 to PAn are located on the inside of positions immediately above the neighboring source line S1 and source line S2. The first main common electrode CAL1 is located immediately above the source line S1. The first main common electrode CAR1 is located immediately above the source line S2. The first sub-common electrode CBU1 is located immediately above the gate line G1. The first sub-common electrode CBB1 (not shown) is located immediately above the gate line G2.

A first alignment film AL1 is disposed on that surface of the array substrate AR, which is opposed to the counter-substrate CT, and the first alignment film AL1 extends over substantially the entirety of the active area ACT. The first alignment film AL1 covers the main pixel electrodes PA1 to PAn and sub-pixel electrode PB of the pixel electrode PE, and the first main common electrode CAL1, first main common electrode CAR1, first sub-common electrode CBU1 and first sub-common electrode CBB1 of the common electrode CE, and is also disposed over the third insulation film 13. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, a common electrode CE, and a second alignment film AL2, on the inside of the second insulative substrate 20, that is, on that side of the second insulative substrate 20, which is opposed to the array substrate AR.

The black matrix BM partitions each pixel PX and forms an aperture portion AP. Specifically, the black matrix BM is disposed so as to be opposed to wiring portions, such as the source lines S, gate lines G, storage capacitance lines, and switching elements. In the example illustrated, the black matrix BM includes portions which are located above the source line S1 and source line S2 and extend in the second direction Y, and portions which are located above the gate line G1 and gate line G2 (not shown) and extend in the first direction X, and the black matrix BM is formed in a grid shape. The black matrix BM is disposed on an inner surface 20A of the second insulative substrate 20, which is opposed to the array substrate AR.

The color filter CF is disposed in association with each pixel PX. Specifically, the color filter CF is disposed on an inside partitioned by the black matrix BM on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF.

The second main common electrodes CA2-1 to CA2-$n$+1, second sub-common electrode CBU2 and second sub-common electrode CBB2 (not shown) of the common electrode are formed on that side of the overcoat layer OC, which is opposed to the array substrate AR. In particular, the second main common electrode CA2-1, second main common electrode CA2-$n$+1, second sub-common electrode CBU2 and second sub-common electrode CBB2 are located immediately below the black matrix BM. The second main common electrode CA2-1 is located immediately above the first main common electrode CAL1 The second main common electrode CA2-$n$+1 is located immediately above the first main common electrode CAR1. The second main common electrodes CA2-2 to CA2-$n$ are located between the second main common electrode CA2-1 and second main common electrode CA2-$n$+1, and none of the main pixel electrodes or none of the source lines is located immediately below the second main common electrodes CA2-2 to CA2-$n$. The second sub-common electrode CBU2 is located immediately above the first sub-common electrode CBU1. The second sub-common electrode CBB2 (not shown) is located immediately above the first sub-common electrode CBB1.

In the above-described aperture portion AP, a region between the pixel electrode PE and the common electrode CE corresponds to a transmissive region through which light can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the second main common electrodes CA2-1 to CA2-$n$+1, second sub-common electrode CBU2 and second sub-common electrode CBB2 of the common electrode CE, and the overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, and a second alignment treatment direction PD2, in which the second alignment film AL2 initially aligns the liquid crystal molecules, are parallel to each other, and are opposite to or identical to each other. For example, as shown in FIG. 3, the first alignment treatment direction PD1 and second alignment treatment direction PD2 are substantially parallel to the second direction Y and are identical to each other in the X-Y plane.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is composed of, for example, a liquid crystal material having a positive (positive-type) dielectric constant anisotropy.

A first optical element OD1 is attached by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1. In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed, for example, such that the polarization axis thereof is substantially parallel or substantially perpendicular to the direction of extension of the main pixel electrode PA or main common electrode CA.

Specifically, when the direction of extension of the main pixel electrode PA or main common electrode CA is the second direction Y, the absorption axis of one of the polarizers is substantially parallel to the second direction Y (i.e. substantially perpendicular to the first direction X), or is substantially perpendicular to the second direction Y (i.e. substantially parallel to the first direction X).

Alternatively, one of the polarizers is disposed, for example, such that the polarization axis thereof is parallel or perpendicular to the initial alignment direction of liquid crystal molecules, that is, the first alignment treatment direction PD1 or second alignment treatment direction PD2. When the initial alignment direction is parallel to the second direction Y, the polarization axis of one of the polarizers is parallel to the second direction Y or parallel to the first direction X.

In an example shown in part (a) of FIG. 3, the first polarizer PL1 is disposed such that the first polarization axis AX1 thereof is perpendicular to the direction of extension of the main pixel electrode PA or the initial alignment direction (second direction Y) of liquid crystal molecules LM (i.e. parallel to the first direction X), and the second polarizer PL2 is disposed such that the second polarization axis AX2 thereof is parallel to the direction of extension of the main pixel electrode PA or the initial alignment direction of liquid crystal molecules LM (i.e. parallel to the second direction Y).

In addition, in an example shown in part (b) of FIG. 3, the second polarizer PL2 is disposed such that the second polarization axis AX2 thereof is perpendicular to the direction of extension of the main pixel electrode PA or the initial alignment direction (second direction Y) of liquid crystal molecules LM (i.e. parallel to the first direction X), and the first polarizer PL1 is disposed such that the first polarization axis AX1 thereof is parallel to the direction of extension of the main pixel electrode PA or the initial alignment direction of liquid crystal molecules LM (i.e. parallel to the second direction Y).

Next, the operation of the liquid crystal display panel LPN having the above-described structure is described with reference to FIG. 2 to FIG. 5.

Specifically, in a state in which no voltage is applied to the liquid crystal layer LQ, that is, in a state (OFF time) in which no potential difference (or electric field) is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 3. Specifically, the initial alignment direction of the liquid crystal molecule LM is parallel to the second direction Y (or 0' to the second direction Y) which is the direction of extension of the main pixel electrode PA or the main common electrode CA.

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment).

As the result of the alignment treatment of the first alignment film AL1 in the first alignment treatment direction PD1, the liquid crystal molecule LM in the vicinity of the first alignment film AL1 is initially aligned in the first alignment treatment direction PD1. As the result of the alignment treatment of the second alignment film AL2 in the second alignment treatment direction PD2, the liquid crystal molecule LM in the vicinity of the second alignment film AL2 is initially aligned in the second alignment treatment direction PD2. In addition, when the first alignment treatment direction PD1 and the second alignment treatment direction PD2 are parallel and identical to each other, the liquid crystal molecules LM are splay-aligned as described above, and the alignment of the crystal molecules LM in the vicinity of the first alignment film AL1 on the array substrate AR and the alignment of the crystal molecules LM in the vicinity of the second alignment film AL2 on the counter-substrate CT become symmetric in the up-and-down direction, with respect to the middle part of the liquid crystal layer LQ as the boundary, as describe above. Thus, optical compensation can be made even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The light, which enters the liquid crystal display panel LPN, is linearly polarized light, which is perpendicular to the first absorption axis AX1 of the first polarizer PL1. The polarization state of such linearly polarized light varies depending on the alignment state of liquid crystal molecules LM when the light passes through the liquid crystal layer LQ. However, at the OFF time, the polarization state of linearly polarized light, which has passed through the liquid crystal layer LQ, hardly varies. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference (or electric field) is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 3, in the pixel PX, the liquid crystal molecule LM in a region between the main pixel electrode PA1 and the second main common electrode CA2-1 (or first main common electrode CAL1) rotates counterclockwise relative to the second direction Y, and is aligned in a upper left direction in the Figure. The liquid crystal molecule LM in a region between the main pixel electrode PA1 and the second main common electrode CA2-2 rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the main pixel electrodes PA or at positions overlapping the second main common electrodes CA2, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, and enters the liquid crystal display panel LPN. The light entering the liquid crystal display panel LPN is linearly polarized light which is perpendicular to the first absorption axis AX1 of the first polarizer PL1. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules LM which are aligned in a 45°-225° azimuth direction or a 135°-315° azimuth direction relative to the first direction X (A is a wavelength of light passing through the liquid crystal layer LQ). Thereby, the polarization state of the light, which has passed through the liquid crystal layer LQ, becomes linear polarization parallel to the second direction Y. Thus, at the ON time, at least part of the light emerging from the liquid crystal layer LQ passes through the second polarizer PL2 (white display). However, at a position overlapping the pixel electrode or common electrode, since the liquid crystal molecules maintain the initial alignment state, black display is effected as in the case of the OFF time.

As has been described above, according to the structure of the present embodiment, the liquid crystal molecules LM in one pixel are aligned, mainly in at least two directions in the X-Y plane. In order to realize such alignment, it should suffice if at least the second main common electrodes CA2 are included as the common electrode CE, in addition to the pixel electrode PE. Specifically, the first main common electrodes CA1 and first sub-common electrodes CB1, which are provided on the array substrate AR, and the second sub-common electrodes CB2, which are provided on the counter-substrate CT, function to shield an electric field from other wiring lines, to make stronger the electric field that is necessary for alignment control of the liquid crystal molecules LM, to produce an electric field that is necessary for alignment control of liquid crystal molecules at neighboring pixels, or to give redundancy to the common electrode CE, and these components are not indispensable for forming the above-described multiple domains.

Figure 6:
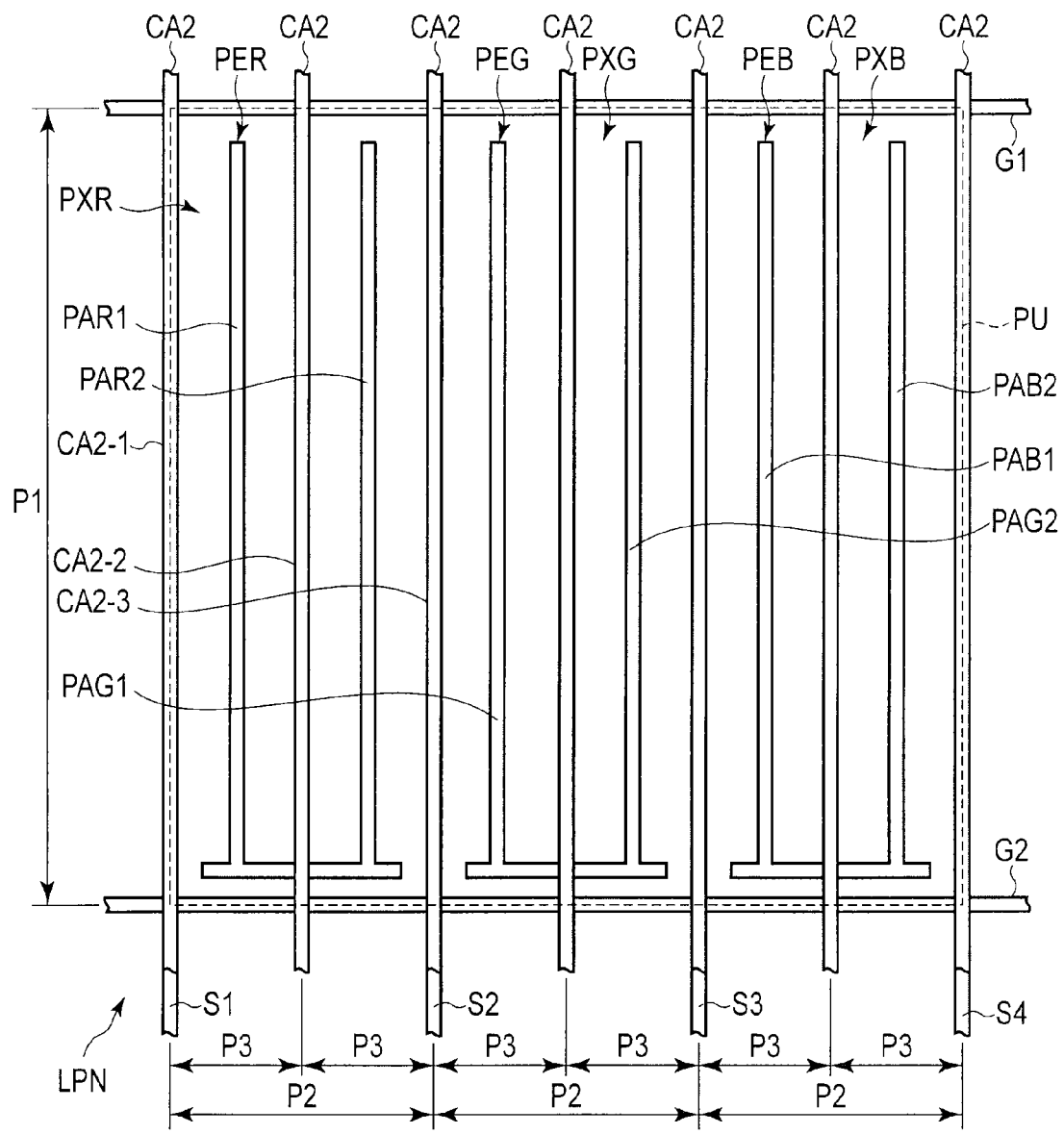
FIG. 6 is a plan view which schematically shows a structure example of one unit pixel in the embodiment.

FIG. 6 is a plan view which schematically shows a structure example of one unit pixel in the embodiment.

One unit pixel PU is substantially square in the X-Y plane. This one unit pixel PU includes a red pixel PXR, a green pixel PXG and a blue pixel PXB, each of which is formed in a rectangular shape. In the example illustrated, each of the red pixel PXR, green pixel PXG and blue pixel PXB has a rectangular shape having a greater length in the second direction Y than in the first direction X, and these pixels are arranged in the named order in the first direction X. Although not described in detail, a red color filter is disposed in the red pixel PXR, a green color filter is disposed in the green pixel PXG, and a blue color filter is disposed in the blue pixel PXB.

A gate line G1 and a gate line G2 are arranged with a first pitch P1 in the second direction Y. A source line S1, a source line S2, a source line S3 and a source line S4 are arranged with a second pitch P2 in the first direction X.

The red pixel PXR is partitioned by the gate line G1, gate line G2, source line S1 and source line S2. The green pixel PXG is partitioned by the gate line G1, gate line G2, source line S2 and source line S3. The blue pixel PXB is partitioned by the gate line G1, gate line G2, source line S3 and source line S4. The length in the first direction X of the unit pixel PU, which is composed of the three pixels (PXR, PXG, PXB), that is, the length from the source line S1 to source line S4 (three times the second pitch P2), is substantially equal to the length in the second direction Y of the unit pixel PU, that is, the length from the gate line G1 to gate line G2 (the first pitch P1). Specifically, the first pitch P1 is about three times the second pitch P2.

Each of a pixel electrode PER of the red pixel PXR, a pixel electrode PEG of the green pixel PXG and a pixel electrode PEB of the blue pixel PXB includes the same number of main pixel electrodes. In the example illustrated, each pixel electrode PE includes two main pixel electrodes PA. Specifically, the pixel electrode PER includes two main pixel electrodes PAR1 and PAR2, the pixel electrode PEG includes two main pixel electrodes PAG1 and PAG2, and the pixel electrode PEB includes two main pixel electrodes PAB1 and PAB2.

A common electrode CE includes three second main common electrodes CA2 per pixel, in association with the pixel electrode PE including the two main pixel electrodes PA. For example, in the red pixel PXR, the common electrode CE includes a second main common electrode CA2-1 which is located above the source line S1, a second main common electrode CA2-2 which is located between the main pixel electrode PAR1 and main pixel electrode PAR2 of the pixel electrode PER, and a second main common electrode CA2-3 which is located above the source line S2. In the meantime, the second main common electrode CA2-3 also functions as a second main common electrode of the green pixel PXG which neighbors the red pixel PXR. The second main common electrode CA2-1, second main common electrode CA2-2 and second main common electrode CA2-3 are arranged with a third pitch P3.

The same applies to the green pixel PXG, and second main common electrodes CA2 are disposed on both sides of the main pixel electrode PAG1 of the pixel electrode PEG and on both sides of the main pixel electrode PAG2 of the pixel electrode PEG. In addition, as regards the blue pixel PXB, second main common electrodes CA2 are disposed on both sides of the main pixel electrode PAB1 of the pixel electrode PEB and on both sides of the main pixel electrode PAB2 of the pixel electrode PEB.

In the example illustrated, since the number n of main pixel electrodes PA of the pixel electrode PE is two, three second main common electrodes CA2 are disposed in each pixel. Specifically, in each pixel, two aperture portions are formed between the second main common electrodes CA2 which neighbor with the third pitch P3, and one main pixel electrode PA is opposed to each aperture portion. In addition, the second main common electrodes CA2 are disposed, respectively, at positions opposed to the source lines S which are disposed at the left side end portion and right side end portion of the pixel PX. Thus, double the third pitch P3 of second main common electrodes CA2 is substantially equal to the second pitch P2 of source lines S. This relationship similarly applies to the red pixel PXR, green pixel PXG and blue pixel PXB.

As described above, when the number of main pixel electrodes PA, which are included in one pixel electrode PE, is n, the number of second main common electrodes CA2, which are disposed in one pixel, is (n+1), and one main pixel electrode PA is disposed between neighboring second main common electrodes CA2. In other words, a structure, in which the second main common electrodes CA2 are disposed on both sides of the main pixel electrode PA, is formed as a basic structure, and an n-number of sets of the basic structure are arranged in the first direction X which crosses the second direction Y that is the direction of extension of the main pixel electrode PA, and thereby it becomes possible to adapt to the structure in which the length (pixel width) of the pixel PX in the first direction X is increased. In this case, too, in order to keep the substantially square shape of the unit pixel PU including three color pixels, it is desirable to set the length (or first pitch P1) of the pixel PX in the second direction Y to be about three times the length (second pitch P2) of the pixel PX in the first direction X.

In the case where the size of one unit pixel PU is relatively large and there is a demand for a resolution of, e.g. less than 200 ppi (i.e. the unit pixel PU has a square shape with each side of 120 µm or more in the first direction X and second direction Y, the first pitch P1 is 120 µm or more, and the second pitch is 40 µm or more), if the pixel PX is to be composed of only one set of the above-described basic structure, the transmittance would lower. The reason for this is as follows.

Specifically, if the electrode width in the first direction X of each of the main pixel electrode PA and second main common electrode CA2 is maintained, the inter-electrode distance in the first direction X between the main pixel electrode PA and second main common electrode CA2 increases in accordance with the increase in length of the pixel PX in the first direction X. Consequently, with a driving voltage which is substantially equal to a driving voltage in the case of a high resolution, an electric field enough to rotate liquid crystal molecules LM cannot be produced between the pixel electrode PE and common electrode CE, and a sufficient transmittance cannot be obtained.

Alternatively, if the electrode width in the first direction X of each of the main pixel electrode PA and second main common electrode CA2 is increased, it is possible to suppress an increase of the inter-electrode distance in the first direction X between the main pixel electrode PA and second main common electrode CA2. However, at parts overlapping the pixel electrode PE and common electrode CE, since a lateral electric field for rotating liquid crystal molecules LM is hardly produced (or an electric field enough to drive liquid crystal molecules LM is not produced), the liquid crystal molecules LM hardly move from the initial alignment direction, as in the case of the OFF time. Thus, in accordance with the increase of the electrode width of each of the main pixel electrode PA and second main common electrode CA2, the area of the aperture portion which contributes to display decreases, and a sufficient transmittance cannot be obtained.

Taking this into account, under the condition that an electric field enough to rotate liquid crystal molecules can be produced between the pixel electrode PE and the common electrode CE, the inter-electrode distance in the first direction X between the main pixel electrode PA and second main common electrode CA2 is adjusted. In the case where the pixel width in the first direction X cannot be covered by only one set of the basic structure, a plurality of sets of the basic structure are arranged in the first direction X. Thereby, it becomes possible to adapt to various resolutions, in particular, a low resolution, without causing a decrease in transmittance.

Figure 7:
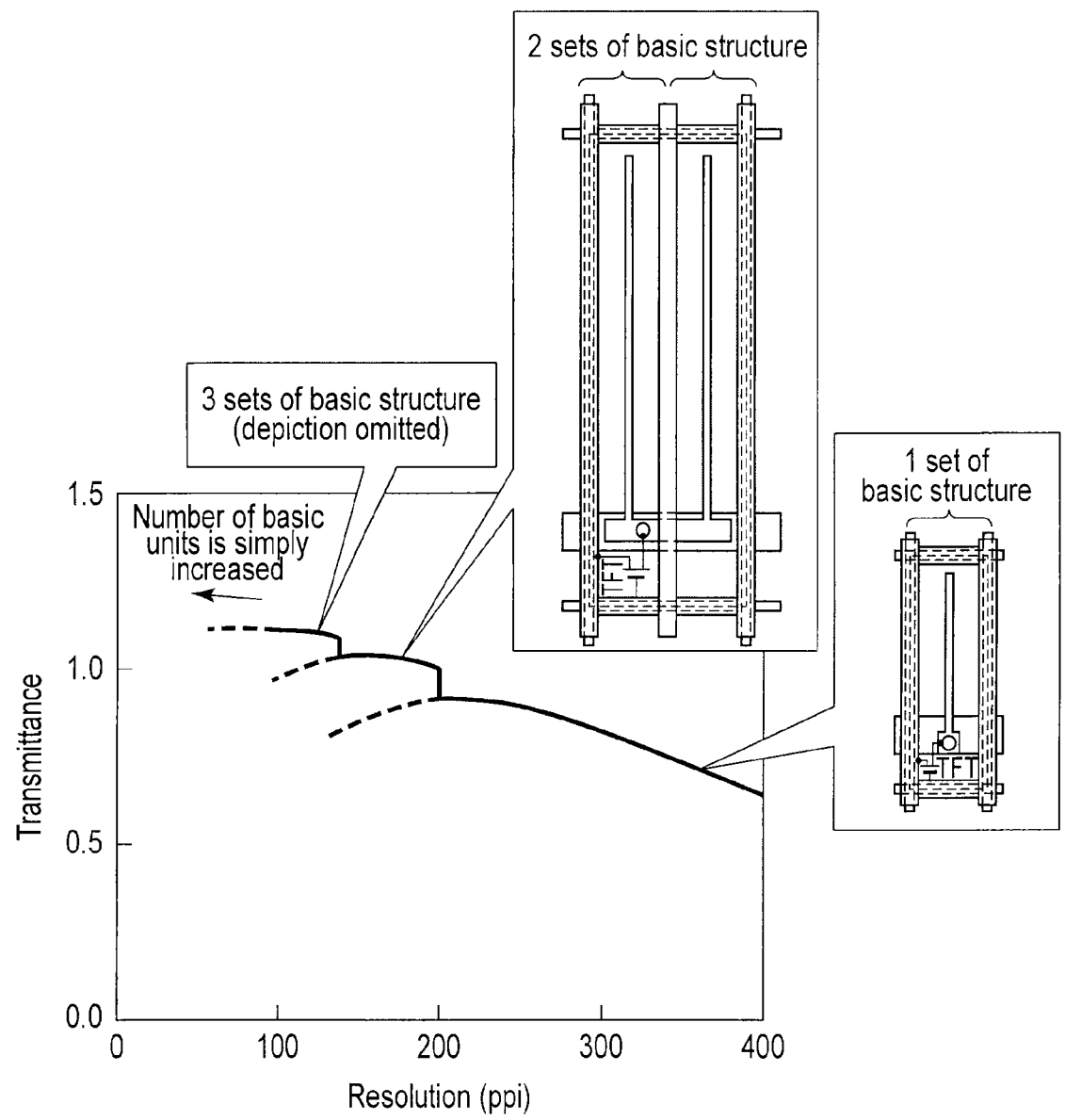
FIG. 7 is a graph showing an example of the relationship between a resolution and a transmittance.

FIG. 7 is a graph showing an example of the relationship between a resolution and a transmittance.

In the example illustrated, with the pixel structure including one set of the basic structure, it is possible to adapt to a resolution of 200 ppi or more. However, as the resolution increases, the size of one unit pixel PU decreases and the area that contributes to display also decreases, and such a tendency is exhibited that the transmittance lowers. In the case of one set of the basic structure, when the resolution is less than 200 ppi, the tendency that the transmittance decreases is exhibited for the above-described reason, that is, because the liquid crystal molecules do not easily rotate in accordance with the increase in inter-electrode distance between the main pixel electrode PA and second main common electrode CA2, or because the electrode width is increased in order to suppress the increase in inter-electrode distance.

In the case of the resolution of less than 200 ppi, a pixel structure including two sets of the basic structure is adopted. Thereby, the transmittance can be increased. However, even in the case of the two sets of the basic structure, at such a low resolution that the pixel width further increases, the tendency that the transmittance lowers is exhibited for the above-described reason. Thus, a pixel structure including three sets of the basic structure is adopted, and thereby the transmittance can be increased. In this manner, by combining a plurality of sets of the basic structure, a decrease in transmittance can be suppressed even when there is a demand for a relatively low resolution.

According to the present embodiment, a high transmittance can be obtained in the inter-electrode gap between the pixel electrode PE and the common electrode CE. In addition, a transmittance per pixel can sufficiently be increased by increasing the inter-electrode distance between the main pixel electrode PA and the main common electrode CA. As regards product specifications in which the pixel pitch is different, the peak condition of the transmittance distribution can be used by varying the inter-electrode distance (e.g. by varying the position of disposition of the main common electrode CA in relation to the main pixel electrode PA). Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch.

According to the present embodiment, the transmittance is sufficiently lowered in the region overlapping the black matrix BM. The reason for this is that the electric field does not leak to the outside of the pixel from the position of the common electrode CE that is located above the source line S, and an undesired lateral electric field does not occur between pixels which neighbor each other with the black matrix BM interposed, and therefore the liquid crystal molecules LM in the region overlapping the black matrix BM keep the initial alignment state, like the case of the OFF time (or black display time). Accordingly, even when the colors of the color filters CF are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the inter-electrode distance between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters CF differ between neighboring pixels, the occurrence of color mixture can be suppressed, and the decrease in color reproducibility or the decrease in contrast ratio can be suppressed.

According to the present embodiment, a plurality of domains can be formed in one pixel. Thus, the viewing angle can optically be compensated in plural directions, and a wide viewing angle can be realized.

According to the present embodiment, since the first main common electrode CA1 is opposed to the source line S, an undesired electric field from the source line S can be shielded. It is thus possible to suppress application of an undesired bias from the source line S to the liquid crystal layer LQ, and to suppress the occurrence of a display defect such as crosstalk (e.g. a phenomenon that when a pixel potential for displaying white is supplied to the source line that is connected to the pixel PX in the state in which the pixel PX is set at a pixel potential for displaying black, light leaks from a part of the pixel PX and the brightness increases).

According to the embodiment, since the first sub-common electrode CB1 is opposed to the gate line G, an undesired electric field from the gate line G can be shielded. It is thus possible to suppress application of an undesired bias from the gate line G to the liquid crystal layer LQ, and to suppress the occurrence of a display defect such as burn-in, and the occurrence of light leakage due to an alignment defect of liquid crystal molecules.

According to the embodiment, since the first main common electrodes CA1 and first sub-common electrodes CB1, which are provided on the array substrate AR, are electrically connected and formed in a grid shape, redundancy can be improved. In addition, since the second main common electrodes CA2 and second sub-common electrodes CB2, which are provided on the counter-substrate CT, are electrically connected and formed in a grid shape, redundancy can be improved. Accordingly, even if breakage occurs in a part of the common electrode CE that is provided on the array substrate AR or breakage occurs in a part of the common electrode CE that is provided on the counter-substrate CT, the common potential can stably be supplied to each pixel PX, and the occurrence of a display defect can be suppressed.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 3. An angle θ1 formed between the second direction Y and the initial alignment direction D is 0° or more and 45° or less. From the standpoint of alignment control of liquid crystal molecules LM, it is very effective that the angle θ1 is about 5° to 30°, more preferably 20° or less. Specifically, it is desirable that the initial alignment direction of liquid crystal molecules LM be substantially parallel to a direction in a range of 0° to 20° relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is reversed, it is desirable that the above-described formed angle θ1 be within the range of 45° to 90°, preferably the range of 70° or more.

Since a lateral electric field is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and common electrode CE do not necessarily need to be formed of a transparent, electrically conductive material, and may be formed of an opaque conductive material such as aluminum (Al), titanium (Ti), silver (Ag), molybdenum (Mo), or tungsten (W).

In the case where at least one of the pixel electrode PE and common electrode CE is formed of the above-described opaque conductive material, linearly polarized light, which has entered the liquid crystal display panel LPN, is substantially parallel or substantially perpendicular to the direction of extension of the edges of the pixel electrode PE or common electrode CE. In addition, the direction of extension of the gate line G, storage capacitance line C and source line S which are formed of the above-described opaque conductive material is substantially parallel or perpendicular to the linearly polarized light which has entered the liquid crystal display panel LPN. Thus, the plane of polarization of the linearly polarized light, which is reflected by the edges of the pixel electrode PE or common electrode CE, the gate line G, storage capacitance line C and source line S, is hardly disturbed, and the plane of polarization at the time of passing through the first polarizer PL1, which is a polarizer, can be maintained. Accordingly, at the OFF time, since linearly polarized light, which has passed through the liquid crystal display panel LPN, is sufficiently absorbed by the second polarizer PL2, which is an analyzer, light leakage can be suppressed. Specifically, the transmittance can be sufficiently reduced at the time of black display, and the decrease in contrast ratio can be suppressed. In addition, since there is no need to increase the width of the black matrix BM in order to cope with light leakage in the vicinity of the pixel electrode PE or common electrode CE, it is possible to suppress a decrease in area of the aperture portion AP or a decrease in transmittance at the ON time.

In the present embodiment, the structure of the pixel PX is not limited to the above-described examples.

The above-described examples relate to the structure in which the storage capacitance line is disposed immediately below the sub-pixel electrode PB. However, the gate line may be disposed immediately below the sub-pixel electrode PB. In addition, the position of disposition of the storage capacitance line may not be on the lower side of the pixel (i.e. in the vicinity of the gate line G2), and the position of disposition of the gate line may not be at the upper side end portion or lower side end portion of the pixel.

The above-described examples relate to the case in which the pixel electrode PE includes the main pixel electrodes PA and sub-pixel electrode PB. However, the pixel electrode PE may not include the sub-pixel electrode PB, if the pixel electrode PE can be electrically connected to the switching element SW.

The above-described examples relate to the case in which the direction of extension of the main pixel electrodes PA is the second direction Y. However, the main pixel electrodes PA may extend in the first direction X. In this case, the direction of extension of the first main common electrode CA1 and second main common electrode CA2 is the first direction X. In addition, in this case, when the first signal lines along the first direction X are the gate lines G and the second signal lines along the second direction Y are the source lines S, as in the above-described examples, the first main common electrodes CA1 are opposed to the gate lines G, the second main common electrodes CA2 are located above the gate lines G, the first sub-common electrodes CB1 are opposed to the source lines S, and the second sub-common electrodes CB2 are located above the source lines S. In addition, in this case, when the first signal lines along the first direction X are the source lines S and the second signal lines along the second direction Y are the gate lines G, the first main common electrodes CA1 are opposed to the source lines S, the second main common electrodes CA2 are located above the source lines S, the first sub-common electrodes CB1 are opposed to the gate lines G, and the second sub-common electrodes CB2 are located above the gate lines G.

The above-described examples relate to the case in which in relation to the pixel electrode PE as a first electrode including the main pixel electrodes PA, there is provided the common electrode CE as a second electrode including the main common electrodes CA located on both sides of the first electrode. Alternatively, in relation to the common electrode CE as a first electrode including the main common electrode CA, there may be provided the pixel electrode PE as a second electrode including the main pixel electrodes PA located on both sides of the first electrode.

As has been described above, according to the present embodiments, a liquid crystal display device which is adaptable to various resolutions, without degrading the display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a plurality of first signal lines which extend in a first direction and are disposed with a first pitch along a second direction crossing the first direction, a plurality of second signal lines which extend in the second direction and are disposed with a second pitch along the first direction, and a first electrode including an n-number of first main electrodes (n is an integer of 2 or more) which are arranged in the first direction, each of the first main electrodes extending in the second direction between two neighboring ones of the second signal lines;
a second substrate including a second electrode including a plurality of second main electrodes which extend in the second direction on both sides of each of the first main electrodes and are disposed with a third pitch along the first direction, and second sub-electrodes which are located above each of the first signal lines, extend in the first direction and are continuous with the second main electrodes; and a liquid crystal layer including liquid crystal molecules held between the first substrate and the second substrate, wherein the n-number of times the third pitch is substantially equal to the second pitch, and any one of the second main electrodes is located above each of the second signal lines, the first pitch is greater than the second pitch, the first substrate further includes a switching element which is electrically connected to any one of the first signal lines and any one of the second signal lines, the first electrode further includes at least one first sub-electrode which is electrically connected to the switching element, extends in the first direction, and is continuous with the n-number of first main electrodes, a transmissive region is formed between the first electrode and the second electrode, the first substrate further includes a third main electrode which is opposed to each of the second signal lines and has the same potential as the second main electrodes, the n-number of first main electrodes, the third main electrode, and the first sub-electrode are formed directly on an upper surface of a same insulation film, and the first substrate does not include any electrode electrically connected to the third main electrode between adjacent of the first main electrodes in plan view.

2. The liquid crystal display device of claim 1, wherein the first pitch is about three times the second pitch.

3. The liquid crystal display device of claim 1, wherein the first substrate further includes a third sub-electrode which is opposed to each of the first signal lines and is continuous with the third main electrode.

4. The liquid crystal display device of claim 1, wherein the first substrate further includes a storage capacitance line extending in the first direction, and
   the first sub-electrode is located in an area overlapping the storage capacitance line.

5. The liquid crystal display device of claim 1, wherein the second pitch is 40 μm or more.

6. The liquid crystal display device of claim 1, wherein second main electrodes are located above each of the third main electrodes and between the first main electrodes, and extend in the second direction.

7. A liquid crystal display device comprising:
a first substrate including a plurality of first signal lines which extend in a first direction and are disposed with a first pitch along a second direction crossing the first direction, a plurality of second signal lines which extend in the second direction and are disposed with a second pitch of 40 μm or more, which is less than the first pitch, along the first direction, and a first electrode including, an n-number of first main electrodes (n is an integer of 2 or more) which are arranged in the first direction, each of the first main electrodes extending in the second direction between two neighboring ones of the second signal lines;

a second substrate including a second electrode including a plurality of second main electrodes which extend in the second direction on both sides of each of the first main electrodes and are disposed with a third pitch along the first direction; and a liquid crystal layer including liquid crystal molecules held between the first substrate and the second substrate, wherein the n-number of times the third pitch is substantially equal to the second pitch, and any one of the second main electrodes is located above each of the second signal lines, the first electrode further includes at least one first sub-electrode which extends in the first direction and is continuous with the n-number of first main electrodes, a transmissive region is formed between the first electrode and the second electrode, the first substrate further includes a third main electrode which is opposed to each of the second signal lines and has the same potential as the second main electrodes, the n-number of first main electrodes, the third main electrode, and the first sub-electrode are formed directly on an upper surface of a same insulation film, and the first substrate does not include any electrode electrically connected to the third main electrode between adjacent of the first main electrodes in plan view.

8. The liquid crystal display device of claim 7, wherein the first pitch is about three times the second pitch.

9. The liquid, crystal display device of claim 7, wherein the first substrate further includes a third sub-electrode which is opposed, to each of the first signal lines and is continuous with the third main electrode.

10. The liquid crystal display device of claim 9, wherein the second electrode further includes second sub-electrodes which are opposed to the third sub-electrodes and are continuous with the second main electrodes.

11. The liquid crystal display device of claim 7, wherein the first substrate further includes a storage capacitance line extending in the first direction, and
   the first sub-electrode is located in an area overlapping the storage capacitance line.

12. The liquid crystal display device of claim 7, wherein second main electrodes are located above each of the third main electrodes and between the first main electrodes, and extend in the second direction.

* * * * *